June 30, 1925.
F. SARGENT ET AL
1,543,727
METHOD OF AND APPARATUS FOR LIMITING CONCENTRATION
OF SALTS IN WATER IN BOILERS
Filed Sept. 28, 1918
3 Sheets-Sheet 1
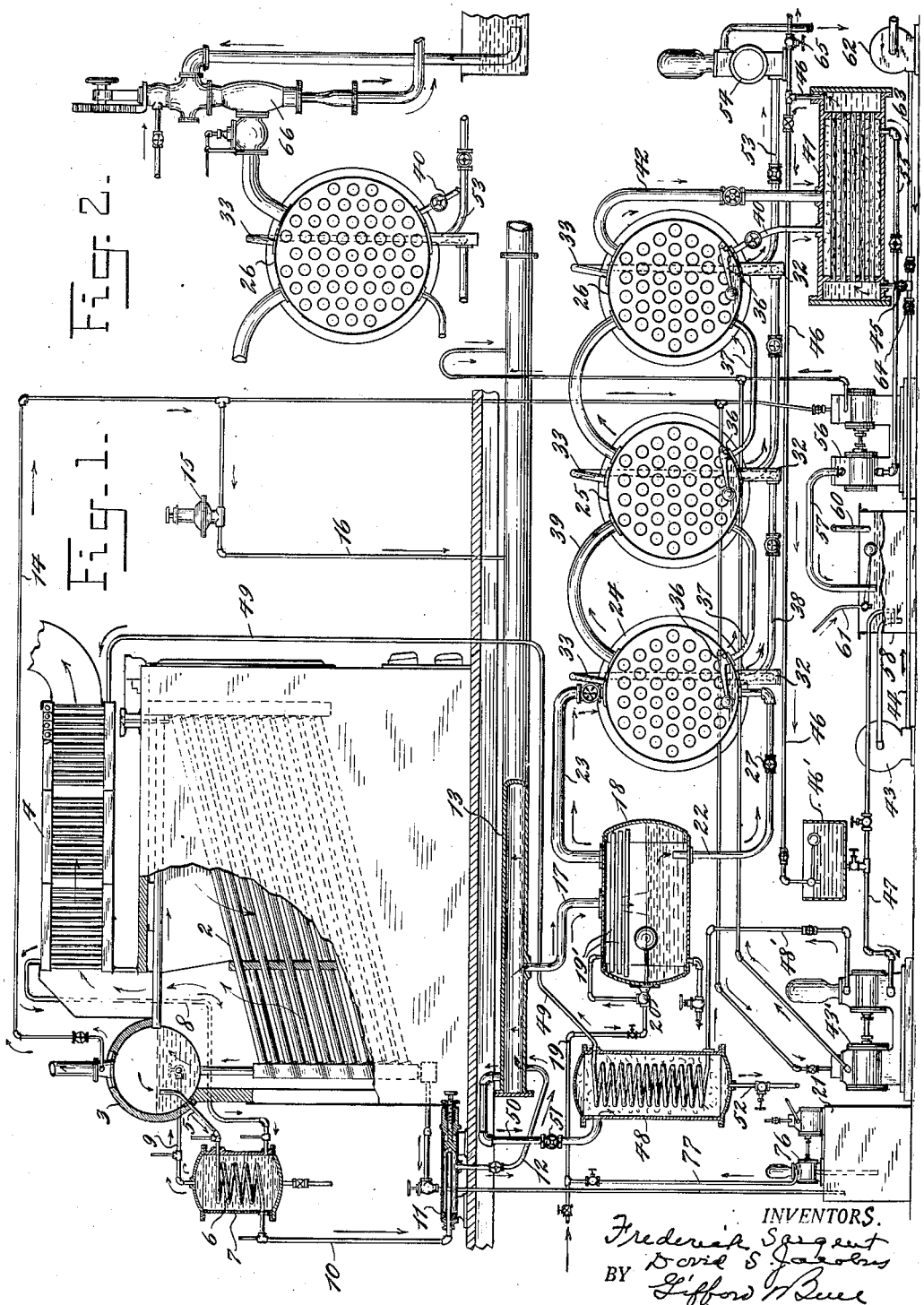

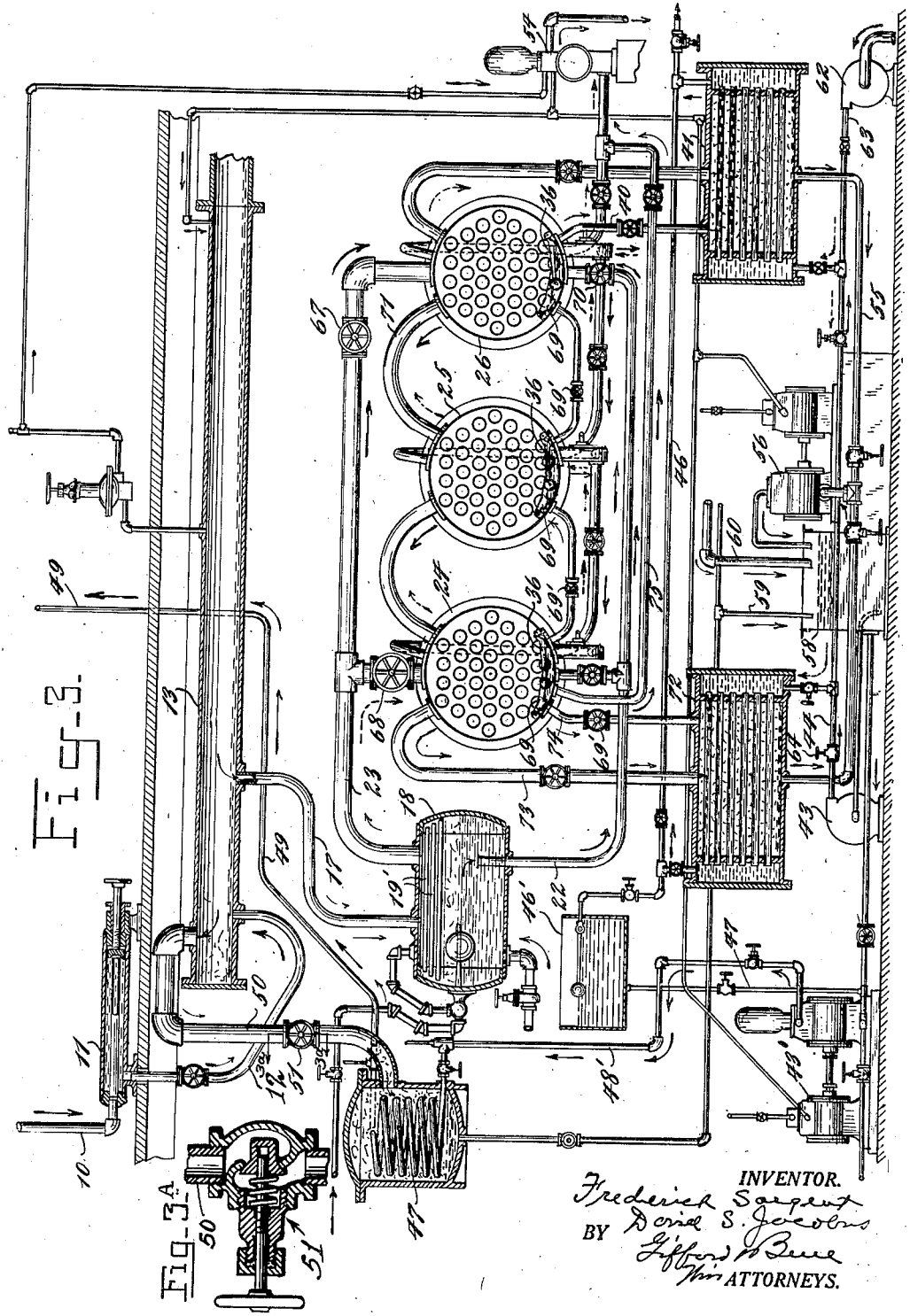

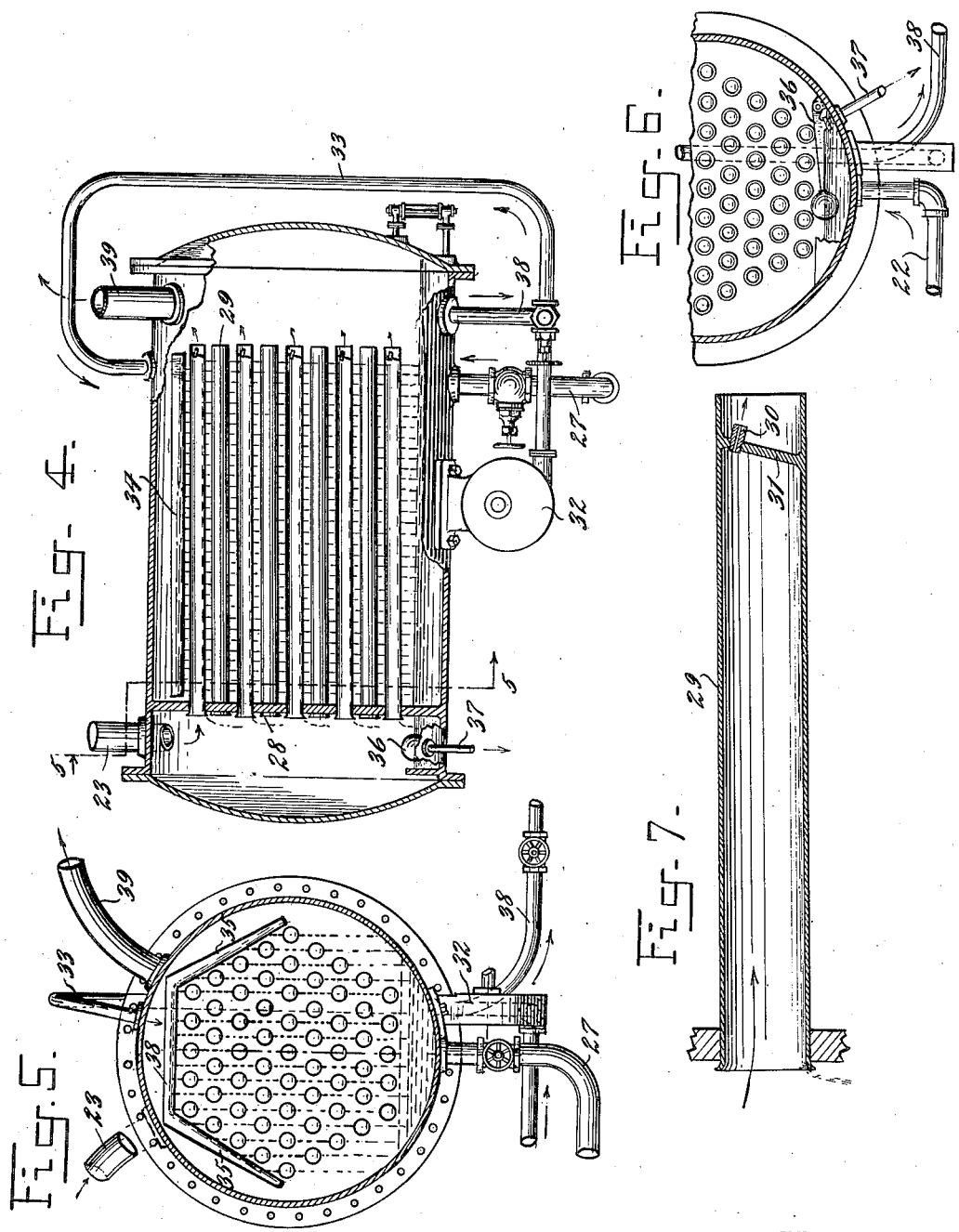

Patented June 30, 1925.

1,543,727

UNITED STATES PATENT OFFICE.

FREDERICK SARGENT, OF GLENCOE, ILLINOIS, AND DAVID S. JACOBUS, OF JERSEY CITY, NEW JERSEY, ASSIGNORS TO THE BABCOCK & WILCOX COMPANY, OF BAYONNE, NEW JERSEY, A CORPORATION OF NEW JERSEY.

METHOD OF AND APPARATUS FOR LIMITING CONCENTRATION OF SALTS IN WATER IN BOILERS.

Application filed September 28, 1918. Serial No. 256,140.

*To all whom it may concern:*

Be it known that we, FREDERICK SARGENT, a citizen of the United States, residing at Glencoe, in the county of Cook and State of Illinois, and DAVID S. JACOBUS, a citizen of the United States, residing at Jersey City, in the county of Hudson and State of New Jersey, respectively, have invented a new and useful Improvement in Method of and Apparatus for Limiting Concentration of Salts in Water in Boilers, of which the following is a full, clear, and exact description, reference being had to the accompanying drawings, all of which are of a diagrammatic character, forming part of this specification, in which Figure 1 is a side elevation partly in section showing one form of our apparatus for limiting the concentration of salts in feed water supplied to a boiler and economizer; Fig. 2 illustrates a modification in which a jet condenser is used instead of a surface condenser; Fig. 3 is a view generally similar to Fig. 1, showing a modified reversible form of apparatus; Fig. 3ᵃ is a valve section taken on 3ᴬ—3ᴬ of Fig. 3; Fig. 4 is a sectional side elevation showing one of the multiple evaporator effects which we prefer to employ; Fig. 5 is a cross section on the line 5—5 of Fig. 4, with the partition partly broken away; Fig. 6 is a detail of a float valve arranged to regulate the outflow of condensed steam from one of the multiple evaporator effects; and Fig. 7 is an enlarged longitudinal section of one of the evaporating tubes which we prefer to employ in the effect.

In certain plants, distilled water is used for the make-up water to compensate for losses through leakage, etc., because the available water is not suitable for boiler purposes. For example, in some cases, sea water is the only available source of supply.

Our invention relates to such plants where water is evaporated for use as make-up water, and it is designed to improve the efficiency and economy of the plants and return heat to the system which would be lost under ordinary conditions of operation.

Furthermore, our system avoids wasting the heat in the water blown from the interior of the boilers. Independently of the fact that the make-up water may be distilled water, there is ordinarily enough leakage in the condensers to cause the water in the boilers to become concentrated to a point which will require them to be blown down.

In our system, the boilers are preferably blown down continuously as well as independently and over-concentration is thereby avoided while economical results are secured by returning to the system the heat in the water blown from the boilers.

The invention, therefore, provides the practical advantage of being able to maintain the concentration of the boilers within a given limit without undue waste, through blowing down the boilers; it also provides an economical system for supplying distilled make-up water to the system.

In carrying out our invention, we utilize the fact that when water containing salts is blown from the boiler and is drawn into an atmosphere of a lower pressure and temperature, part of it will at once flash into steam. Hence it is desirable to save the water taken from the boiler and purify it rather than to waste it and use distilled water to take its place.

Our system in its preferred form embodies the following features in connection with a continuous blow-off.

To prevent water taken from the boiler from reducing the water level below a fixed limit, the entrance of the blow-off is preferably intermediate of the height of the steam drum and at a point beneath the normal water level.

To prevent steam being taken off from the boiler when the water falls below this level, owing to the interruption of the feed or for other reason, the blow-off water will pass to a coil in a chamber where it is surrounded with feed water, causing an interchange of heat, which will reduce the temperature of the blow-off water, for example 50°, after which the water will pass through a thermostat which will automatically act to close the blow-off whenever steam at the boiler temperature reaches the thermostat.

The blow-off water is taken from the thermostat to a collecting main in which a steam pressure is maintained preferably of about ten to fifteen pounds above the atmosphere. The drips from the steam traps and like apparatus will also flow into this collecting main which will collect the steam from the exhaust of the auxiliaries. A reducing valve is arranged to take live steam from the boiler to the collecting main to maintain the desired pressure in the main. From the collecting main the steam and water pass to a collecting tank before passing to the multiple evaporators. The water level in the collecting tank is preferably maintained by admitting make-up water through a float valve.

Condensed vapor from the multiple evaporator flows into a condenser in which a partial vacuum is preferably maintained. The condensed steam from this condenser is led to a collecting tank where it mingles with the condensed steam from the main condensers. From the collecting tank the water is led to the supply for the boiler and economizer feed pumps. The storage tank is provided with a float valve to admit feed water from a second storage tank if the level falls below a minimum.

In the drawings, referring to the form of Figures 1, 4, 5, 6 and 7, 2 represents the tubes of a water tube boiler and 3 its steam and water drum. 4 is an economizer shown as arranged in three successive sections in the outlet flue of the boiler so as to be acted upon by the waste gases. 5 is a blow-off pipe, the upper end of which is about midway of the height of the steam and water drum and just beneath the normal water level therein, this pipe leading to a coil 6 in the interchanger 7. The feed passes from the economizer 4 through the pipe 8 into the interior of the interchanger 7 where, after surrounding and contacting with the coils 6, it passes out through a pipe 9 into the water space of the steam and water drum 3.

The water which is blown continuously from one of the boilers passes through the coil in the interchanger 7, thence through the pipe 10 into and through a thermostat device 11, and thence through the valved pipe 12 into a collecting main 13. The thermostat device 11 is arranged to regulate the flow of water so that a given temperature is maintained in the pipe 10. Should the temperature fall, a greater amount of water will flow through the thermostat device; whereas should the temperature become excessive the flow is lessened. By so adjusting the flow through the pipe 12 that the temperature therein remains nearly constant at some point below the temperature in the steam and water drum 3, the amount of water flowing out through the pipe 10 may be maintained at any desirable fraction or percentage of the amount of feed water entering through the pipe 9, to give uniform conditions of operation. Should the level of the water in the boiler fall to a point where steam is admitted to the pipe 5, this would cause an excess of temperature in the pipe 10 and the thermostat device would close to prevent steam being blown directly from the boiler into the collecting main 13.

A pressure of ten to fifteen pounds per square inch above the atmospheric pressure is preferably maintained in the collecting main 13. The exhaust from the auxiliaries is fed into the collecting main 13. All drip pipes in this system are connected to the collecting main 13 so as to convey the hot drip water, together with any steam which may blow through therewith, to said main, and any deficiency in pressure therein is made up by supplying live steam to the main through the pipe 14 which leads from the boiler and to the reducing valve 15, which reduces it to the desired pressure, and from which it flows through the pipe 16 into the collecting main 13. The right hand end of the main 13 is shown as broken away in Figure 1 to indicate that a connection may be made to receive a certain amount of steam from one of the low pressure stages of the steam turbine or from other auxiliaries or apparatus in the plant.

From the collecting main 13 the steam and water pass through the pipe 17 to a collecting tank 18, wherein the steam is separated from the water. We preferably maintain a certain water level in this tank, any deficiency in the water being supplied through pipe 19 controlled by a float valve 20, the water so added constituting the make-up water for the plant. The water admitted through pipe 19 flows over a series of trays 19' inside of tank 18, the trays being so arranged that a number of water surfaces are exposed to the steam to be heated thereby. The described means for heating the water within the tank 18 is equivalent to an open feed water heater. Ordinarily, the water supplied through pipe 19 is water containing salts, such as sea water, or water taken from the tank 21 into which the boilers are blown down to remove any sludge accumulating therein. Such sludge is allowed to settle out in the tank 21 before the water is pumped to the tank 18. The pump is shown at 76, 77 being the pipe leading therefrom into pipe 19.

After separating the water and steam in the tank 18, the water flows separately through pipe 22 to the evaporator, while the steam flows separately to the evaporator through the pipe 23. We here show an evaporator having three effects, 24 being the first effect, 25 the second and 26 the third effect. The valve 27 in the pipe 22 is properly set to throttle the water and admit the proper amount to the first effect.

One type of evaporator effect which we may use is shown in detail in Figures 4 to 7, inclusive. Each effect is in the form of a horizontal drum, having near one end a tube sheet 28, having a series of tube holes in which are expanded the open ends of the evaporating tubes 29. These tubes extend from the tube sheet horizontally at a slight upward incline toward their other ends, which are free. They are preferably 3 or 4 inches in diameter, and about five feet long, the upper end of each tube being preferably about 1½ inches higher than the lower end. In order to remove any non-condensible gases from the tubes, vents are provided as shown at 30 in Figure 7. This vent consists of a plug screwed into the upper part of a closed inclined partition 31, the plug having a hole about $\frac{1}{32}$ inch in diameter through which steam with any contained non-condensible gases continuously passes. This vent is so arranged that it will not be closed up by the water which is being circulated through the effect coming in contact with it.

The tubes 29 serve as a heating surface for transmitting the heat from the steam which enters the tripple effect through pipe 23 to the liquid which is circulated over the tubes. The water which passes into each effect is circulated by means of a circulating pump 32, which forces the water up through the pipe 33, the water entering the top of the effect, and being led into a perforated trough 34 having the inclined perforated sides 35 which distributed it over the evaporator tubes, and cause it to drop over them.

The water which is condensed from the steam after collecting to a certain height in each effect, flows through a trap or float device 36 through a pipe 37, to the next effect, or, if from the third effect, to the condenser. A certain amount of water which is circulated over the evaporating tubes in the first effect by means of the pump 32 is allowed to flow through the valved pipe 38 into the second effect. The steam evaporated from the water which is circulated over the outside of the evaporating tubes in the first effect, passes through the pipe 39 to the second effect.

The action of the second effect 25 is the same as the first. The action of the third effect 26 is the same as the second effect, except that instead of passing the water and steam to a fourth effect at a lower pressure, the distilled water passes through a valved pipe 40 to the surface condenser 41, while the steam from the third effect passes through pipe 42 to the steam condenser 41.

The water for condensing the steam in the condenser 41 is ordinarily the feed water which enters the boiler or boilers. This feed water is drawn from the tank 58 by the pump 43, and is forced through the pipe 44, and enters the condenser 41 through the valved connection 45. The heated circulating water, or feed water, leaves the condenser through the pipe 46 and enters the tank 46'. From the tank 46' the water passes to the feed pump 43' through the valved pipe connection 47. It is then forced into the feed water heater 48 through the valved pipe connection 48'. After passing through the coil in the heater the feed water is fed through the pipe 49 to the boiler or boilers, first entering the economizer or economizers when used, and then passing to the boiler or boilers. The feed water heater 48 is supplied with any excess steam from the collecting main 13, through pipe 50, the valve 51 in this pipe being in the form of a relief valve, so set that steam will flow from the line 13 into the heater 48, when the pressure reaches a predetermined point in the collecting main 13. Any excess steam delivered to the main 13 above that required for operating the system will therefore be delivered to the feed water heater 48, and the heat in the same will be returned to the system. The water which condenses from the steam supplied to the feed water heater 48, passes through the pipe 52, and is used for feed water, or fed to the tank 18.

The concentrated water from which steam has been evaporated, and which has been discharged from the third effect 26, passes through the valved connection 53 to the pump 54, from which point it is blown to waste.

In order to maintain a certain pressure in the collecting main 13, in case of a deficiency in the pressure therein, steam from the boiler is led to it through the pipe 14, fitted with reducing valve 15, already described. This reducing valve is set to act at a lower pressure than the regulating valve 51, and does not allow any steam from the boiler to enter the collecting main unless the pressure falls below a certain pre-determined limit.

The distilled water and steam from the condenser 41 pass through the pipe 55 to the vacuum pump 56, from which it is discharged through the pipe 57 into the collecting tank 58. The condensed steam from the condensers of the steam turbine or other prime movers which constitute the main supply of feed water enters the tank 58 through the pipe 60. Where the load carried by a plant varies through wide ranges a greater amount of distilled water for making up for leakage may be more readily made at some times than at others. In this case some of the feed water may be stored at the time that the make-up water is more readily produced and the water so stored afterwards be allowed to flow into the tank 58 through the connection 61, which is fitted with a valve controlled by a float.

In certain cases, sea water or water containing salts will be used for condensing the steam in the condenser 41 in place of feed water. In this case, the sea water is pumped by means of the pump 62 through the valved connection 63 into the condenser 41, the valve 64 in the pipe 44 being closed. When sea water is used for condensing the main portion of the steam, after it circulates through the condenser it is discharged to waste through the valved connection 65.

In Figure 2 we show a jet condenser 66, which may be used in place of the surface condenser shown in Figure 1, for condensing the vapor discharged from the third effect 26. In case the jet condenser is used the condensate or distilled water from the third effect 26 is drawn off through the pipe 40 by means of a vacuum pump. The concentrated water passes to the pump 54, and is allowed to run to waste. The condensing water for the jet condenser is normally the feed water, as is the case when a surface condenser is employed, and hence all of the heat in the steam leaving the third effect is returned to the feed water in the same way as where a surface condenser is employed. In starting up the plant with a jet condenser the steam from the third effect of the evaporator would be condensed with salt water, and would be thrown to waste; and during this starting up the amount of distilled water given by the apparatus would be the same as would be secured with the third effect eliminated, that is, with a double effect. In general, to obtain a given amount of distilled water from the apparatus with a jet condenser operated with salt or sea water for condensing the vapor from the last effect of the evaporator, it will be necessary to use one more effect in the evaporator than where a surface condenser is employed. As high as five effects may be employed in the evaporator, and more distilled water may be obtainable than is necessary for use for make-up water. The excess distilled water may be stored to use either in an emergency where there is an undue amount of leakage in the condensers, and in starting up the plant, etc. In case the evaporator is capable of producing more distilled water than is desired, its capacity may be readily cut down by admitting a lesser amount of hot water and steam to the evaporator.

In Figure 3 we show the same general apparatus as that of Figure 1, but in reversible form, some of the parts shown in Figure 1 being omitted, and others modified. This triple effect evaporator may be reversed, so that what is the first effect in one case may be the third effect in the other, and correspondingly what is the third effect in one case becomes the first effect in the other. Two surface condensers are also shown for use in connection with the triple effect evaporator. The advantage of arranging the piping so that the evaporator can be reversed, and of employing duplicate condensers, is that it avoids the necessity of shutting down in case of trouble with one of the condensers.

In this form of Figure 3, in which parts similar to Figure 1 are marked with similar numerals, when the effect is used in the reverse way from that described in connection with Figure 1, the steam from the tank 18 passes through the valve 67, into the effect 26, which is now the first effect, the valve 68 to the effect 24 being closed. The float controlled valves 69 are shown on the opposite side of the effect from the positions of the float controlled valve 36 of the first form. When 26 is the first effect, 25 the second effect and 24 the third effect, the pipe connections leading from the float controlled valves 36 are closed. In case it is desired to make 24 the first effect, 25 the second, and 26 the third effect, the valves 69' in the pipe connections leading from the float controlled valves 69 are closed, and the valves in the pipe connections leading from the float controlled valves 36 are open. Instead of placing the float controlled valves at the opposite sides of the effects, a single float controlled valve may be employed in each effect, with cross-pipe connections outside of the effects.

The water separated from the steam in the tank 18 flows through the pipe 22, and through the valve 70 into the first effect, the valve 70 being set so as to admit the proper amount of water into the first effect 26. The steam which is condensed in the first effect 26 collects in the form of water, and after it reaches a certain height in the effect 26, flows through the float controlled valve 69 into the second effect 25. The steam which is evaporated from the water circulated over the tubes in the effect 26 passes through the pipe connection 71 to the second effect. The action of the second effect 25 is the same as that of the first effect 26, and the third effect 24 the same as that of the second effect 25. The steam from the third effect 24 passes to the surface condenser 72 through the valved connection 73, and the condensed steam from the third effect 24 passes to the surface condenser 72 through the valved connection 74. The concentrated water from the third effect 24 passes through the valved connection 75 to the pump 54, from whence it is pumped to waste. The condensed water from the condenser 72 passes to the vacuum pump 56, from whence it is pumped into the tank 58. The apparatus is arranged so that either the feed water may be used for condensing the steam in the surface condensers 72, or sea water may be so used in the same way as in the arrangement shown in Figure 1. Throughout my specification and claims, when I speak of 'salts', I intend to cover any foreign elements, this term not being limited to the technical meaning thereof.

Many variations may be made in the type of boiler employed, the blow-off system, the means for interchanging the heat and avoiding loss of the heat from the blow-off water, etc., without departing from our invention. For example, when the feed water is employed as circulating water for condensing the vapor from the last effect of the evaporator, the feed water may be circulated through the condenser before it enters the tank 58. Again, in case a two stage economizer is used the feed water employed for condensing may be pumped through the condenser directly to and through the low pressure stage of the economizer or economizers.

What we claim and desire to secure by Letters Patent of the United States is:—

1. A boiler having a blow-off system, means to regulate automatically the amount of water blown off from the boiler in accordance with the amount of feed water fed to the boiler and means for utilizing the heat in the blow-off water for supplying distilled make-up water, and means to deliver such distilled make-up water to the boiler.

2. A boiler having a blow-off system, a closed receptacle to receive the blow-off water and to permit it to flash into steam therein, means to condense at least a part of such flashed steam to supply distilled make-up water, means to deliver such distilled make-up water to the boiler, a feed water heater through which the boiler feed water flows on its way to the boiler, and means to pass steam from said closed receptacle to the feed water heater to heat such feed water when the pressure in said closed receptacle exceeds a predetermined pressure.

3. A boiler having a blow-off system, a heat interchanger arranged to absorb heat from the blow-off water, and a thermostatic device arranged to close the blow-off system whenever the temperature therein rises above a predetermined point.

4. A boiler having a blow-off pipe leading from an intermediate level in the steam and water drum to a heat interchanger, a pipe arranged to lead the blow-off water to a separating tank, and an evaporator to which the steam and water are led from the separating tank.

5. A boiler having a blow-off pipe leading from an intermediate level of a steam and water drum, an interchanger arranged to receive heat from the blow-off water, a pipe arranged to lead the blow-off water from the interchanger to a separating tank, an automatic heat-regulator arranged to control the flow through the blow-off pipe, and an evaporator arranged to receive the fluid from the separating tank.

6. A boiler having a blow-off pipe leading from the intermediate level of a steam and water drum and extending through a heat interchanger to a collecting main, a connection from the collecting main to a separating tank, and multiple evaporator effects connected to the separating tank.

7. A boiler having a blow-off pipe leading from the intermediate level of a steam and water drum and extending through a heat interchanger to a collecting main, a connection from the collecting main to a separating tank, multiple effects connected to the separating tank, and a condenser connected to the multiple effects.

8. A boiler having a blow-off pipe leading from the intermediate level in the steam and water drum through a heat interchanger to a collecting tank, means for maintaining the level in the collecting tank by admitting make-up water, and an evaporator connected to the collecting tank.

9. A boiler having a blow-off pipe leading from the intermediate level in the steam and water drum through a heat interchanger to a collecting tank, means for maintaining the level in the collecting tank by admitting make-up water, an evaporator connected to the collecting tank, and a condenser connected to the evaporator.

10. A boiler having a continuous blow-off system, means for automatically limiting the flow through the blow-off system, and means for feeding the blow-off water into an atmosphere of lower pressure and temperature to cause part of it to flash into steam.

11. A boiler having a continuous blow-off system, means for automatically increasing and decreasing the flow through the blow-off system proportionately to the increase and decrease of flow of feed water to the boiler, and means for feeding the blow-off water into an atmosphere of lower pressure and temperature to cause part of it to flash into steam and condensing such steam for use as make-up water.

12. A boiler having a continuous blow-down system, means for automatically limiting the flow through the blow-down system, means for feeding the blow-down water into an atmosphere of lower pressure and temperature to cause part of it to flash into steam, and means for condensing the steam therefrom.

13. In operating a boiler, the method which consists in blowing off the boiler, extracting some of the heat from the blow-off water and returning it to the boiler feed water, then condensing steam from the blow-off water and returning such condensate to the boiler in the feed water, and permitting the remainder of the blow-off water to flow out of the system.

14. In operating a boiler, the steps consisting of blowing down a boiler in a substantially continuous manner, absorbing heat from the blow-off water into the feed water, then leading the blow-off water into an atmosphere of lower pressure and temperature to cause steam to flash therefrom, condensing said steam, and using it in the make-up water.

15. In operating a boiler, the steps consisting of blowing off the boiler in a substantially continuous manner, absorbing heat from the blow-off water into the feed water, continuously regulating the amount of blow-off water, separating the steam and water in the blow-off water, and passing them to an evaporator and recovering the condensed steam.

16. The process of utilizing heat in hot water drawn from a boiler, consisting in drawing the water from the boiler in a continuous stream, regulating the amount of water so drawn in accordance with the amount of feed water flowing into the boiler, employing the heat of the water drawn from the boiler for evaporating water for the production of distilled water and delivering the distilled water into the boiler.

17. A boiler having a continuous blow-off system and means to regulate automatically the amount of water blown off from the boiler so that it is increased or decreased in proportion to the increase or decrease in the amount of feed water fed to the boiler.

In testimony whereof we have hereunto signed our names in the presence of two subscribing witnesses.

FREDERICK SARGENT.

Witnesses to signature of Frederick Sargent:
   John A. W. Dixon,
   Nathan E. Lewis.

DAVID S. JACOBUS.

Witnesses to signature of David S. Jacobus:
   John A. W. Dixon,
   Nathan E. Lewis.